US007024190B1

United States Patent
Raust et al.

(10) Patent No.: US 7,024,190 B1
(45) Date of Patent: Apr. 4, 2006

(54) METHOD OF RANDOM ACCESS COMMUNICATION USING SUBBANDING AND VARIABLE LENGTH MESSAGES

(75) Inventors: Eric Raust, Oak Hill, VA (US); Steven Mazur, McLean, VA (US); David Schoen, La Jolla, CA (US)

(73) Assignee: ORBCOMM LLC, Herdon, VA (US)

( * ) Notice: Subject to any disclaimer, the term of this patent is extended or adjusted under 35 U.S.C. 154(b) by 0 days.

(21) Appl. No.: 09/517,813

(22) Filed: Mar. 2, 2000

(51) Int. Cl.
*H04B 7/19* (2006.01)
*H04Q 7/20* (2006.01)

(52) U.S. Cl. .................... 455/427; 455/13.1; 455/13.2; 370/316

(58) Field of Classification Search ............. 455/427, 455/428, 429, 430, 13.2, 13.1; 370/232, 370/233, 234, 316, 321
See application file for complete search history.

(56) References Cited

U.S. PATENT DOCUMENTS

| 6,188,896 | B1 * | 2/2001 | Perahia et al. ............... 455/428 |
| 6,269,245 | B1 * | 7/2001 | Li et al. ...................... 455/450 |
| 6,317,583 | B1 * | 11/2001 | Wolcott et al. ............ 455/12.1 |
| 6,332,069 | B1 * | 12/2001 | Zhao et al. ................ 455/12.1 |
| 6,370,117 | B1 * | 4/2002 | Koraitim et al. ............ 370/232 |

\* cited by examiner

*Primary Examiner*—Edan Orgad
(74) *Attorney, Agent, or Firm*—Chadbourne & Parke LLP

(57) ABSTRACT

A method of random access communication uses subbanding and variable length messages to provide efficient communication between a plurality of mobile earth terminals and a plurality of satellites. The subbanding allows each satellite to more efficiently process communications from mobile earth terminals operating under a variety of different rules or regulations. The satellite receivers can be dynamically reconfigured such that they can receive messages of different lengths at different times. The mobile earth terminals can change the size of the messages that they send to take advantage of the newly reconfigured satellite receiver(s). The method can reduce or eliminate errors or delays that occur in prior methods of random access communication.

26 Claims, 2 Drawing Sheets

METHOD OF RANDOM ACCESS COMMUNICATION USING SUBBANDING AND VARIABLE LENGTH MESSAGES

BACKGROUND OF THE INVENTION

1. Field of the Invention

The invention relates to a method for providing a plurality of mobile earth terminals ("METs") random access to communication with one or more satellites, and more particularly, to a method for providing efficient communication between a plurality of METs and a constellation of low earth orbit satellites through the use of subbanding and the use of more than one message length.

2. Description of the Related Art

Numerous methods are known for providing random access to a communication satellite by a plurality of METs typically having "bursty" traffic. Bursty traffic is traffic that is intermittent in nature rather than continuous for extended periods of time. These systems only provide the MET communication access to the satellite when the MET has information to send. Such systems can be contrasted with those providing a cycle during which every possible sender has a certain access window. The complexities of providing an efficient process for random access communications increase significantly when the METs are communicating with a constellation of low earth orbit satellites.

For example, nations have varying regulatory requirements for such communications. In addition, some nations allow communication at frequencies at which another nation may prohibit commercial communications because the frequency is used for emergency, police or military communications. Low earth orbit satellites can have a large footprint that covers several nations simultaneously. Therefore, METs in different nations may try to access the same satellite at the same time. Thus, it would be desirable to provide a communication system wherein the satellites could process information received from a variety of different METs while simultaneously honoring the communication regulations of each of the nations.

Sending messages in a random access communication system requires some amount of overhead communication simply to request and establish the communication link between the MET and the satellite receiver. This is because the bursty nature of the traffic and the large number of METs make it impractical for every MET to have a fixed communication slot.

Sending multiple messages of the same predetermined length to convey a large amount of information increases the amount of overhead necessary as compared with the overhead required to send one message of increased length. Thus, it may seem that simply designing the system with an increased message length might be an effective solution. Increasing the predetermined message length of the system, however, often would be inefficient because many of the messages would not require this much capacity, thereby wasting capacity. Wasting capacity is costly, especially when other METs are waiting to send a message. Thus, it would be desirable to have a communication system that efficiently provides communication to a satellite by allowing METs to send messages of more than one length.

SUMMARY OF THE INVENTION

The present invention provides a method of communication between METs and satellites. The method can be used with a plurality of satellites, each of which has at least one satellite receiver for receiving messages from the METs. Preferably, the satellites each have more than one satellite receiver. Each satellite receiver is tunable to a selected frequency. Users are provided with METs that are adapted to send messages to, and receive messages from, the satellites. The method involves defining at least one subband of the frequency spectrum. The subbands are defined based on, for example, channel spacing, hard power threshold, allowable distance from grid channels and range. Each subband defines a set of discrete frequencies, any one of which potentially can be chosen as the frequency at which the METs send messages to the satellite receiver. The system includes a plurality of gateway earth stations, preferably scattered throughout the world. The gateway earth stations allow communication between the satellites and a gateway control center. The system preferably includes a plurality of gateway control centers scattered in geographical locations around the world where METs are present.

The frequency chosen for the METs to communicate with the satellite receiver is sometimes referred to herein as the "communication channel." The communication channel is selected from the frequencies making up the subband(s) assigned to that satellite receiver.

At least one subband is assigned to each satellite receiver. If possible, more than one subband can be assigned to a satellite receiver. This can be done if multiple subbands have a sufficient number of frequencies in common at which messages can be sent from the METs to the satellite receiver—i.e., if the subbands include a sufficient number of common possible communication channels. The current (i.e., active) communication channel (i.e., frequency) for a satellite receiver is selected by the satellite from the available frequencies defined by the subband(s) currently assigned to that receiver and is preferably based on the factors of power sampling (most important factor), grid preference and quality (least important factor), as explained below.

Each MET is assigned to one of the satellite receivers. Over time, the MET can be assigned to different satellite receivers on different satellites if, for example, the satellites are low earth orbit satellites. The METs are assigned to the satellite receivers by the gateway control centers. The satellite receiver is tuned to the frequency of the current communication channel to receive messages from the METs. The satellites broadcast the current communication channel being used by each satellite receiver directly to the METs so that the METs know on what frequency to transmit their messages.

The gateway control centers can convey information to and from the satellites as well as to and from the METs. A subband is assigned to each gateway control center. The active METs also are assigned to a gateway control center. The METs, however, transmit their messages directly to the satellite receivers. Each gateway control center and its assigned subband is associated with a satellite receiver with which the gateway control center can then communicate through a gateway earth station. As the satellites orbit the earth, the gateway control centers can be successively associated and disassociated with satellite receivers on different satellites. Thus, over time, the subband(s) assigned to a satellite receiver can change. Over time, each MET preferably may be assigned to different satellite receivers, which can be on different satellites.

In accordance with another aspect of the present invention, a method of communication uses satellite receivers that can be dynamically reconfigured to receive messages of different sizes. Preferably, the system uses two different message sizes, which have been predetermined. For example, the satellite receivers can be configured to receive either 16-byte messages or 31-byte messages. Thus, some of the satellite receivers can be receiving 16-byte messages, while other satellite receivers are receiving 31-byte messages. The system tracks the load of messages on each satellite receiver. If, for example, there is currently a much higher demand from the METs for 16-byte messages, one or more of the satellite receivers configured to receive 31-byte messages could be reconfigured to receive 16-byte messages instead. The satellite broadcasts the current message length configuration for each satellite receiver directly to the METs so that the METs know what length message format to use in sending messages to the satellite receiver.

DETAILED DESCRIPTION OF THE PREFERRED EMBODIMENT

The method of the present invention can be carried out in a system having numerous METs and a constellation of low earth orbit satellites. For example, the ORBCOMM® system includes a constellation of 28 low earth orbit satellites including three planes inclined to 45° with eight satellites per plane and two planes inclined to 90° with two satellites each for polar coverage. While METs may be mobile, they may also be stationary in certain applications—e.g., for monitoring a remote piece of equipment such as a pipeline, pump, etc. Thousands of METs situated throughout the world can communicate with one another via the satellites and a plurality of gateway earth stations and gateway control centers. In the preferred embodiment, each satellite has six satellite receivers.

Figure 1:
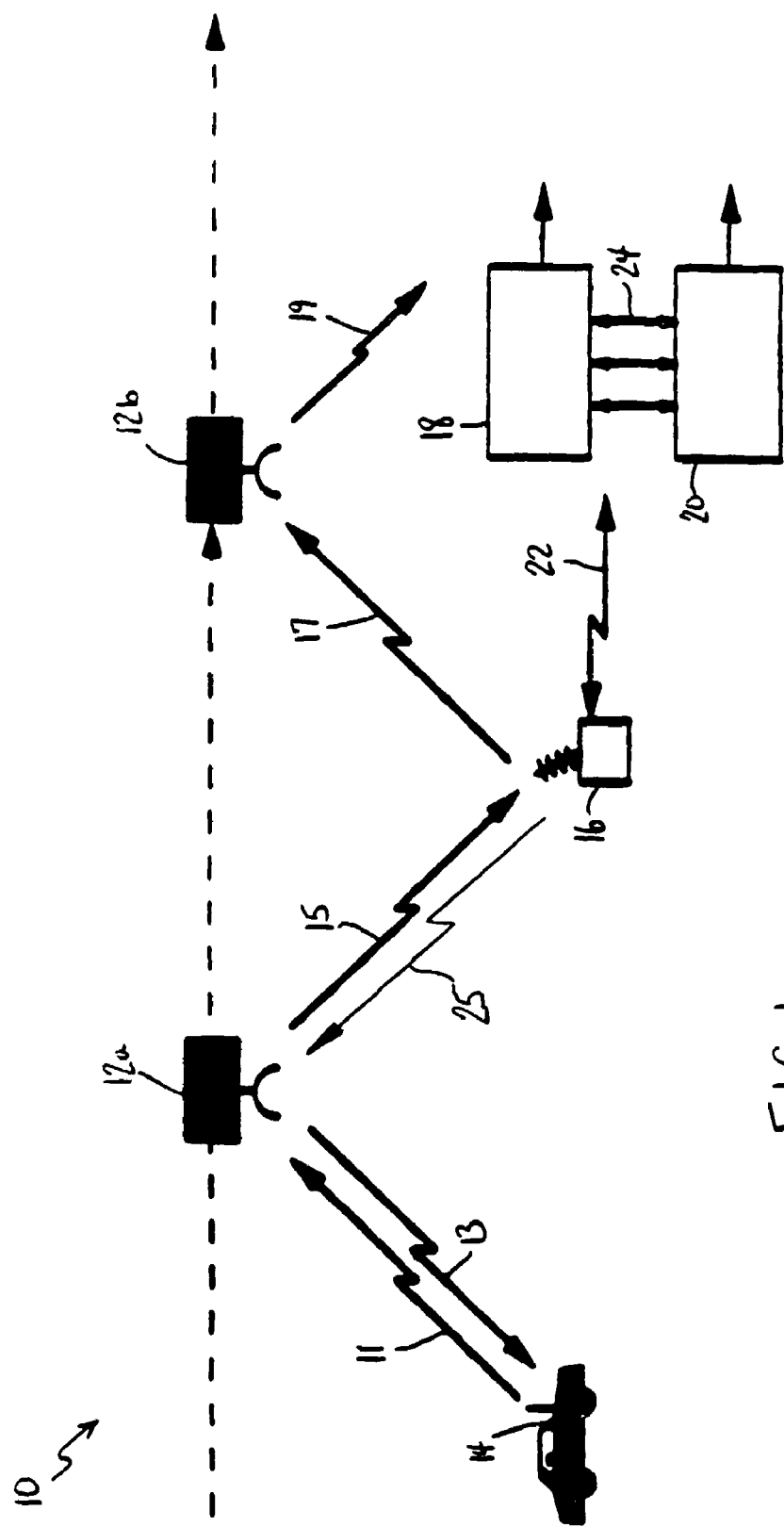
FIG. 1 is schematic diagram of a message handling system that can incorporate the present invention.

FIG. 1 depicts schematically a system 10 that can incorporate the present invention. System 10 can include a plurality of satellites, with two satellites 12a–b being illustrated in FIG. 1, a plurality of METs, such as MET 14 shown carried in an automobile, a plurality of gateway earth stations 16, only one of which is illustrated in FIG. 1, one or more gateway control centers 18, only one of which is illustrated in FIG. 1, and a systems facility 20. System 10 can include a lesser or greater number of satellites as required by any particular application. The system can include, for example, nine gateway earth stations, such as gateway earth station 16, to serve the United States geographic area. Gateway control center 18 can perform various tasks including commissioning new METs by entering pertinent data into a subscriber database, responding to customer inquiries, scanning undeliverable messages for formatting errors, and monitoring and maintaining terrestrial communications facilities. Gateway control center 18 can be given other tasks as desired for any given application. Systems facility 20 generally processes messages and controls the satellite constellation.

A user generates a message (for example, "I won't be home until 4:15") to send to another user of the system. The user sends the message from MET 14 along a path represented by arrow 11 to satellite 12a, which can be a low earth orbit satellite that is currently accessible to MET 14 based upon the position of satellite 12a in its orbit. The message is received by a satellite receiver (not shown in FIG. 1) on satellite 12a. Satellite 12a relays the message to a regional gateway earth station 16 along a path represented by arrow 15. Gateway earth station 16 sends the message over terrestrial facilities indicated by connection 22 to gateway control center 18. Gateway control center 18 sends the message to systems facility 20, as illustrated by connection 24, which may be the Internet or dedicated circuits. The gateway control center 18 then sends an acknowledgement along paths 25 and 13 to MET 14 confirming the gateway control center 18 received the message. The message can then be passed on to the intended recipient either over terrestrial facilities (not shown) or via satellite 12b. If the message is passed via satellite 12b, gateway control center 18 first sends the message to gateway earth station 16, which then transmits the message to satellite 12b along a path represented by arrow 17. Satellite 12b then can transmit the message to the intended recipient along a path represented by arrow 19.

The present invention primarily relates to the communication of the message from originating MET 14 to satellite 12a—i.e., the communication represented by arrow 11. In a random access communication system, MET 14 usually must do two things to communicate its message to satellite 12a. First, MET 14 must request a time slot for access to its assigned satellite receiver on satellite 12a. Second, after being notified of its message communication time slot, MET 14 must send the message to the satellite receiver so that the message is received by the satellite receiver during the assigned time slot. This process is schematically illustrated in FIG. 2.

Figure 2:
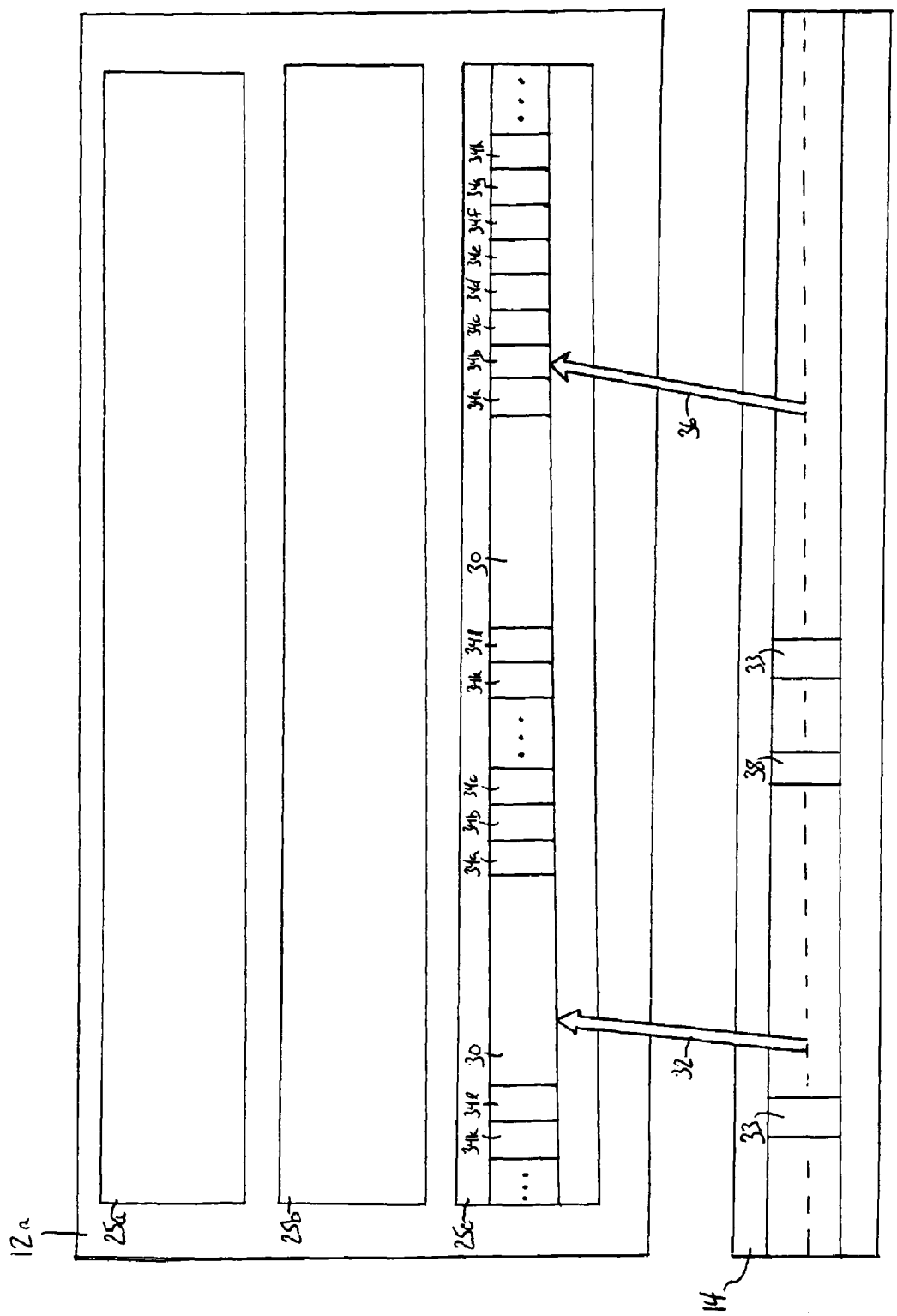
FIG. 2 is a schematic diagram illustrating an acquire/communicate process that can be used in conjunction with the present invention.

FIG. 2 shows satellite 12a having three satellite receivers 25a–c. Satellite 12a can have more or fewer than three satellite receivers 25, as desired in any application. A description of the operation of satellite receiver 25c follows. It should be understood that satellite receivers 25a–b and the satellite receivers on other satellites operate in a similar manner. In FIG. 2, moving to the right on the diagrams within satellite receiver 25c and MET 14 indicates the passage of time. As shown in FIG. 2, every one second, for example, in the preferred embodiment, satellite receiver 25c on satellite 12a cycles through two operations: (1) an "open" time window 30 during which satellite receiver 25c can receive many acquire bursts 32 from METs, such as MET 14; and (2) reserved communicate slots 34a-1 during which satellite receiver 25c can receive communicate bursts 36 from METs, such as MET 14.

Acquire bursts 32 are very short, for example, less than 5 milliseconds. The main purpose of acquire burst 32 is to acquire permission to send a communicate burst 36 at a later point in time. Communicate bursts 36 are longer than acquire bursts 32 and include the substance of the user's message. In the preferred embodiment, communicate bursts 36 can vary between one of two predefined sizes: (1) short (54 millisecond); or (2) medium (104 millisecond). Acquire window 30 can be ⅓ second and twelve reserved communicate slots 34a-1 each can be, for example, 1/18 second for the short (54 millisecond) bursts.

During acquire window 30, satellite receiver 25c searches for an eight-bit acquire burst 32 from a MET, such as MET 14, across a bandwidth of 3000 kHz. Acquire burst 32 can consist of a setup bit required by symmetric differential phase shift keying modulation and a seven-bit identification number randomly chosen by the MET. Acquire burst 32 occupies approximately 3 kHz at the 3 dB down bandwidth.

In the preferred embodiment, satellite receiver 25c can receive and process successfully up to twelve acquire bursts 32 per second.

Each satellite receiver, such as satellite receiver 25c, is tuned to one center frequency at any given time. The process for choosing this frequency is described below. The center frequency is the frequency at which satellite receiver 25c is tuned to receive transmissions from the METs. When satellite receiver 25c receives an acquire burst 32, satellite receiver 25c determines how far away the center frequency of acquire burst 32 was from the center frequency of satellite receiver 25c. This difference is referred to as the frequency offset and is preferably represented as the integer corresponding to the number of 50 Hz steps that the frequency of acquire burst 32 was away from the center frequency of satellite receiver 25c. The frequency offset can be caused by the Doppler effect and oscillator drift at MET 14. The frequency offset is used as described below.

At the opening of acquire window 30, satellite receiver 25c starts a clock in order to record the time at which each acquire burst 32 arrives from the METs. This time is represented by an integer corresponding to the number of one-half millisecond time intervals after acquire window 30 opened that satellite receiver 25c received each acquire burst 32. This time information is used as described below. Satellite 12a also broadcasts a synchronization signal 33 once every second to provide a timing reference for listening METs. This signal is used as described below.

After acquire window 30 closes, satellite 12a processes acquire bursts 32 received by satellite receiver 25c and forms slot assignments 38 which satellite 12a broadcasts to the METs on a different frequency than the frequency used as the communication channel for transmitting messages. Each slot assignment 38 includes: (1) the seven-bit burst identification number originally sent by the MET to satellite 12a; (2) the integer representing the frequency offset of the acquire burst 32 sent by that particular MET; and (3) the integer representing the time after opening of acquire window 30 that satellite receiver 25c received the acquire burst 32 sent by that particular MET.

If, as in FIG. 2, satellite receiver 25c is configured to have twelve communicate slots 34a-1, satellite 12a will broadcast twelve slot assignments 38 for satellite receiver 25c, unless fewer acquire bursts 32 were received. Satellite 12a preferably broadcasts slot assignments 38 for satellite receiver 25c in the order that slot assignments 38 actually will occur. Thus, the first slot assignment 38 broadcast will be intended for the MET that is given permission to transmit its communicate burst 36 to satellite receiver 25c in the first communicate slot 34a, preferably during the next cycle on satellite receiver 25c. The second slot assignment 38 broadcast by satellite 12a will be for the MET that is given permission to transmit its communicate burst 36 during the second communicate slot 34b (MET 14 in the case of FIG. 2), preferably during the next cycle on satellite receiver 25c, and so forth. If satellite receiver 25c received twelve acquire bursts 32 during acquire window 30, the last slot assignment 38 broadcast by satellite 12a for satellite receiver 25c will be intended for the MET that is given permission to transmit its communicate burst 36 in the final communication slot 34l.

Each of the METs that sent an acquire burst 32 monitors broadcast slot assignments 38 and searches for a slot assignment 38 containing the seven-bit randomly selected identification number transmitted to satellite receiver 25c by that MET during acquire window 30. By counting the number of slot assignments 38 broadcast prior to such a slot assignment 38, each MET determines during which communicate slot 34a–l it is to transmit its communicate burst 36 to satellite receiver 25c.

MET 14 uses the frequency offset received in slot assignment 38 to "precorrect" the frequency of communicate burst 36 so that communicate burst 36 will be demodulated correctly at satellite receiver 25c. This precorrection compensates for the Doppler effect and any oscillator drift at MET 14. MET 14 also compares the time when satellite receiver 25c received acquire burst 32 against the time when MET 14 transmitted acquire burst 32 using synchronization signal 33 to synchronize the times on satellite receiver 25c and MET 14. In this way, MET 14 determines the propagation time, which varies depending on the distance between MET 14 and satellite 12a. MET 14 uses the propagation time information to time its transmission of communicate burst 36 such that it will be received by satellite receiver 25c during the assigned communicate slot 34b in FIG. 2. The guard time between communicate bursts 36 from different METs can be reduced to less than 2 milliseconds by accounting for the 8.4 millisecond difference in propagation time between when satellite 12a is directly overhead as compared to when satellite 12a is at the horizon.

After receiving slot assignment 38, MET 14 sends communicate burst 36 to the same satellite receiver 25c to which MET 14 previously sent acquire burst 32. Communicate burst 36 is of the size for which satellite receiver 25c is currently configured, for example, 16 bytes or 31 bytes. Communicate burst 36 can include one synchronization byte and one data packet that can be, for example, 15 bytes or 30 bytes. The one synchronization byte is an eight-bit pattern with high order correlation. Eight bits are needed for this synchronization because less DSP processing power is used here than for synchronizing acquire bursts 32.

The number of satellite receivers 25 on a satellite 12 that are configured for each communicate burst size is determined based on the offered message load from the METs. Thus, as the message load increases on one or more satellite receivers 25 configured for a first size, without many messages being transmitted to one or more satellite receivers 25 configured for a second size, one or more satellite receivers 25 that were configured for the second size can be reconfigured for the first size. Information in the satellite's transmission alerts the METs to the current communicate burst size and frequency settings of each receiver.

Satellite 12 broadcasts the random access frequencies for each active satellite receiver 25 on satellite 12 every four seconds or whenever a frequency is changed, as described below. The receivers are always active but are not in real time mode when no gateway earth station is connected to the satellite. The uplink random access frequencies are grouped corresponding to a particular number identifying a gateway control center 18 to allow subbanding. The subbanding allows system 10 to provide a given level of service to a particular user of system 10 for overlapping geographical regions. Satellites 12 can have a pre-established set of rules with a different quality index for each rule based on gateway control center preferences. METs 14 are programmed to send messages only on the frequencies that are associated with the destination gateway control center as part of the uplink channel packet(s) broadcast by satellites 12.

Satellite 12a determines the frequency to be used as the center frequency (or communication channel) for satellite receiver 25c as follows. The system uses subbands, which are portions of the frequency spectrum defined by certain rules. The rules are based on regulatory requirements of different regions of the world. For example, the system preferably defines subbands based on five criteria: (1) channel spacing; (2) hard power threshold; (3) allowable distance from grid channels; (4) channel exclusions; and (5) range.

Channel spacing describes the grid spacing that is superimposed over the frequency spectrum. For example, the channel spacing can be, e.g., 20 kHz. The hard power threshold is a received power limit above which channels are excluded from being selected as a communication channel. Alternatively, the hard power threshold can prevent a channel from being selected as a communication channel if the power in the channel or either of its neighbors exceeds this value. The allowable distance from grid channels defines the bands about each grid channel within which channels may be selected as a communication channel. Channel exclusions are those grid channels in the subband that are to be excluded from selection as a communication channel. For example, channel exclusions can be frequencies that a nation has reserved for police or military communications. The range defines a contiguous band bounded by the first and last selectable grid channels.

Satellite 12a selects a communication channel (and a spare communication channel) for each satellite receiver 25 by evaluating the possible frequencies defined by the appropriate subband(s) for that receiver. The selection process involves the weighing of three factors: (1) power sampling; (2) grid preference; and (3) quality.

Power sampling is accomplished by the satellite receiver 25 scanning all channels defined by the subband. Channels for which the power samples fall below a specific threshold are declared to be available. The power sample threshold determination is a hard decision and preferably carries the highest weight of the channel selection criteria.

The second channel selection criterion is referred to as grid preference. Around the world, many wireless systems (including paging and cellular systems) are assigned channels on a 25 kHz channelization plan or grid. The system of the present invention can be designed to give preference to channels spaced midway between these standard terrestrial emitters. This criterion preferably carries more weight in the channel selection algorithm than the quality factor described below, but less than the power sampling criterion.

Satellite 12a uses the history of power sample measurements as the third channel selection criterion (referred to as the quality factor). The quality factor can be a metric of the current and past power levels of the channel. This criterion preferably is weighed the least of the three criteria for communication channel selection. Of course, other selection processes using these or other criteria can be used instead of the preferred process just described.

Using these criteria, satellite 12a selects one communication channel to be used, by satellite receiver 25c and also selects a spare. Satellite 12a also selects a communication channel and a spare for each of the other satellite receivers 25 on satellite 12a that form part of the random access communication system.

Satellite 12a repeats the channel selection process approximately every six seconds. Satellite 12a will change the communication channel for a satellite receiver if: (1) the error rate on the satellite receiver exceeds a predefined value; or (2) the new channel selection process scan data shows a power level exceeding the threshold on a currently assigned communication channel.

Where two or more subbands define a sufficient number of common channels, it is possible to concurrently assign more than one subband to a satellite receiver. Where there are a smaller number of gateway control centers connected to a satellite than there are satellite receivers, it also is possible to have more than one satellite receiver assigned to a gateway control center.

By using subbanding, the system is able to efficiently receive messages originating from nations in the same proximity that have different regulations in terms of which frequencies can be used as communication channels. Also, the system can easily change to different communication channels when a problem develops on the current communication channel. Thus, the system provides an improved method of providing random access communication between METs and satellites.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method of communication between earth terminals and satellites, comprising the steps of:
    providing a plurality of satellites, each satellite having at least one receiver tunable to a selected frequency;
    providing a plurality of earth terminals adapted to send messages to, and receive messages from, the plurality of satellites;
    defining at least one subband of the frequency spectrum, said subband not being non-mutually exclusive of other subbands;
    assigning at least one subband to each satellite receiver to accommodate a plurality of regulatory constraints and requirements for one or more countries;
    assigning each earth terminal to one of the satellite receivers;
    dynamically selecting a center frequency for the communication channel for each receiver within the subband assigned to that receiver;
    tuning each satellite receiver to the communication channel selected for that receiver;
    informing at least the listening earth terminals of the communication channel selected for the receiver to which each earth terminal is assigned;
    compensating for differential frequency and time of arrival arising from low-Earth Orbit spacecraft dynamics;
    transmitting messages from the earth terminals to the respective, assigned satellite receivers at the selected communication channel for each receiver.

2. The method of claim 1 wherein said satellite providing step comprises providing a plurality of satellites, each satellite having at least one receiver tunable to a selected frequency and at least one satellite having a plurality of receivers, each receiver being tunable to a selected frequency.

3. The method of claim 1 wherein said satellite providing step comprises providing a plurality of satellites, each satellite having a plurality of receivers, each receiver being tunable to a selected frequency.

4. The method of claim 1 wherein said subband defining step comprises defining each subband based at least partly on channel spacing.

5. The method of claim 1 wherein said subband defining step comprises defining each subband based at least partly on hard power threshold.

6. The method of claim 1 wherein said subband defining step comprises defining each subband based at least partly on allowable distance from grid channels.

7. The method of claim 1 wherein said subband defining step comprises defining each subband based at least partly on channel exclusions.

8. The method of claim 1 wherein said subband defining step comprises defining each subband based at least partly on range.

9. The method of claim 1 wherein said subband defining step comprises defining each subband based on channel spacing, hard power threshold, allowable distance from grid channels, channel exclusions and range.

10. The method of claim 1 wherein said subband assigning step comprises assigning at least two subbands to one satellite receiver.

11. The method of claim 1 wherein said subband assigning step comprises the steps of:
providing at least one gateway control center;
assigning a subband to each gateway control center; and
associating each gateway control center and its assigned subband with a satellite receiver such that the subband is assigned to the satellite receiver to accommodate a plurality of regulatory constraints and requirements for one or more countries.

12. The method of claim 11 wherein said subband assigning step further comprises the step of providing at least one gateway earth station for receiving and transmitting communications between the satellite and the gateway control center.

13. The method of claim 11 wherein said earth terminal assigning step comprises the steps of:
assigning each earth terminal to a gateway control center;
assigning each earth terminal to the satellite receiver associated with the gateway control center for the earth terminal to accommodate a plurality of regulatory constraints and requirements for one or more countries.

14. The method of claim 11 further comprising the step of changing over time the satellite receiver to which a gateway control center is associated.

15. The method of claim 1 further comprising the step of changing over time the at least one subband assigned to each satellite receiver.

16. The method of claim 1 further comprising the step of changing over time the satellite receiver to which an earth terminal is assigned.

17. The method of claim 1 wherein said communication channel selecting step comprises selecting as a center frequency for the communication channel for each receiver one frequency within the subband assigned to that receiver based at least partly on the factor of power sampling.

18. The method of claim 1 wherein said communication channel selecting step comprises selecting as a center frequency for the communication channel for each receiver one frequency within the subband assigned to that receiver based at least partly on the factor of grid preference.

19. The method of claim 1 wherein said communication channel selecting step comprises selecting as a center frequency for the communication channel for each receiver one frequency within the subband assigned to that receiver based at least partly on the factor of quality.

20. The method of claim 1 wherein said communication channel selecting step comprises selecting as a center frequency for the communication channel for each receiver one frequency within the subband assigned to that receiver based on the factors of power sampling, grid preference and quality.

21. The method of claim 20 wherein said communication channel selecting step further comprises weighing the power sampling factor more heavily than the grid preference factor.

22. The method of claim 21 wherein said communication channel selecting step further comprises weighing the grid preference factor more heavily than the quality factor.

23. The method of claim 1 wherein said message transmitting step further comprises the steps of:
(a) the earth terminal transmitting an acquire burst to a satellite receiver;
(b) the satellite on which the satellite receiver resides transmitting a slot assignment to the earth terminal; and
(c) the earth terminal transmitting a communicate burst to the satellite receiver in accordance with the slot assignment.

24. The method of claim 23 wherein step (a) further comprises the earth terminal transmitting an identifier to the satellite receiver and wherein step (b) further comprises the satellite transmitting the identifier to the earth terminal.

25. The method of claim 23 further comprising the step of the satellite determining and transmitting to the earth terminal the frequency offset between the center frequency of the receiver acquire burst and the center frequency of the communication channel.

26. The method of claim 23 further comprising the step of the satellite transmitting to the earth terminal information relating to the time taken for the acquire burst to reach the satellite receiver.

* * * * *